Jan. 6, 1925.
W. G. COX
1,521,757
AUTOMOBILE BUFFER
Filed April 5, 1923
2 Sheets-Sheet 1
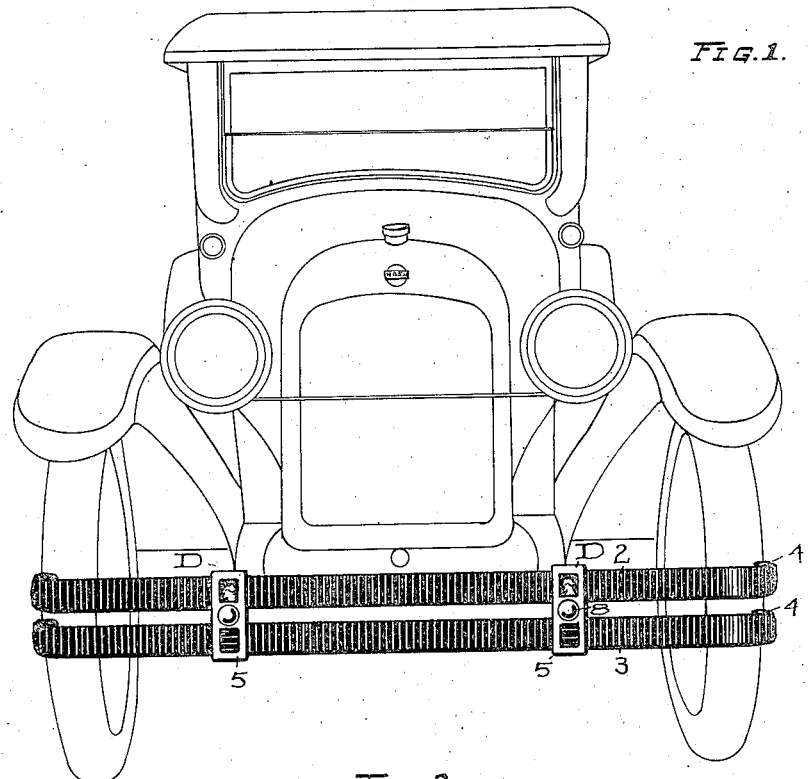
Fig.1.
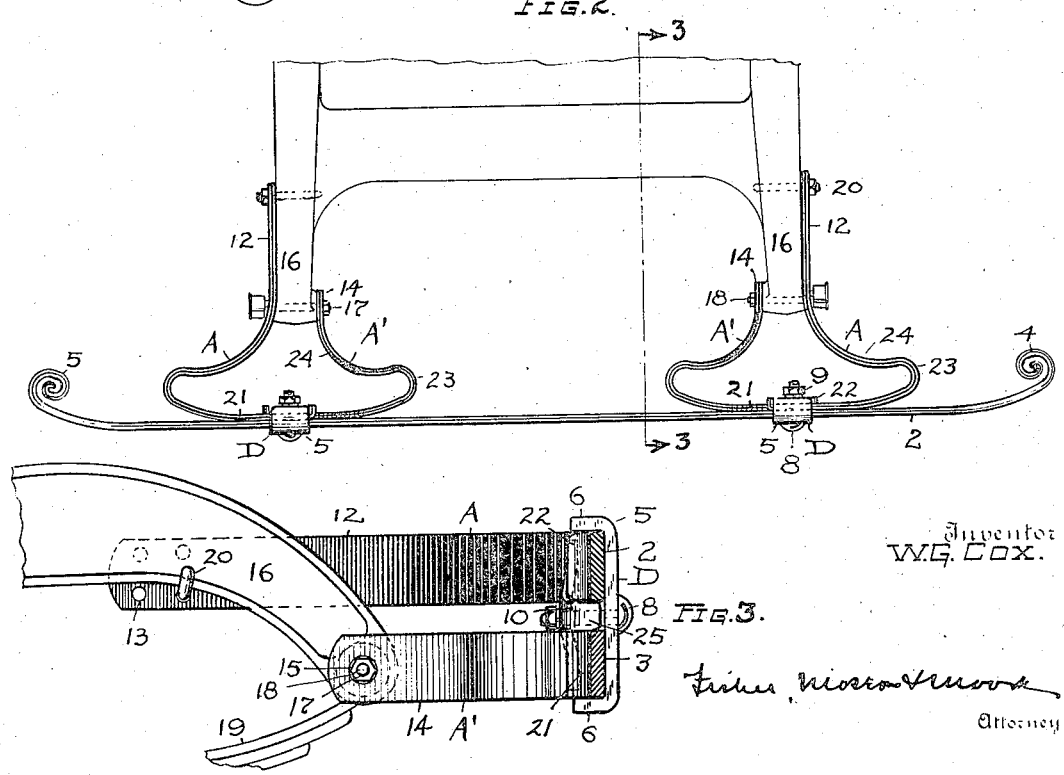
Fig.2.
Fig.3.
Inventor
W. G. COX.
Attorneys Jan. 6, 1925.

W. G. COX 1,521,757

AUTOMOBILE BUFFER

Filed April 5, 1923   2 Sheets-Sheet 2

Inventor
W. G. Cox.

By Fisher, Moser & ......
Attorneys

Patented Jan. 6, 1925.

1,521,757

UNITED STATES PATENT OFFICE.

WILLIAM G. COX, OF CLEVELAND, OHIO, ASSIGNOR, BY MESNE ASSIGNMENTS, TO THE EATON AXLE AND SPRING COMPANY, OF CLEVELAND, OHIO, A CORPORATION OF OHIO.

AUTOMOBILE BUFFER.

Application filed April 5, 1923. Serial No. 630,093.

To all whom it may concern:

Be it known that I, WILLIAM G. COX, a citizen of the United States, residing at Cleveland, in the county of Cuyahoga and State of Ohio, have invented certain new and useful Improvements in an Automobile Buffer, of which the following is a specification.

The buffer herein described is an improvement in that class of devices which serve to protect the ends of an automobile and to deaden a shock or to bear the brunt of opposing forces, and the improvement resides more particularly in the novel arrangement of a plural number of buffer rails and the simple means hereinafter described whereby the complete assembly may be readily attached to and firmly supported upon the projecting ends of the chassis frame of the automobile.

Figure 4:
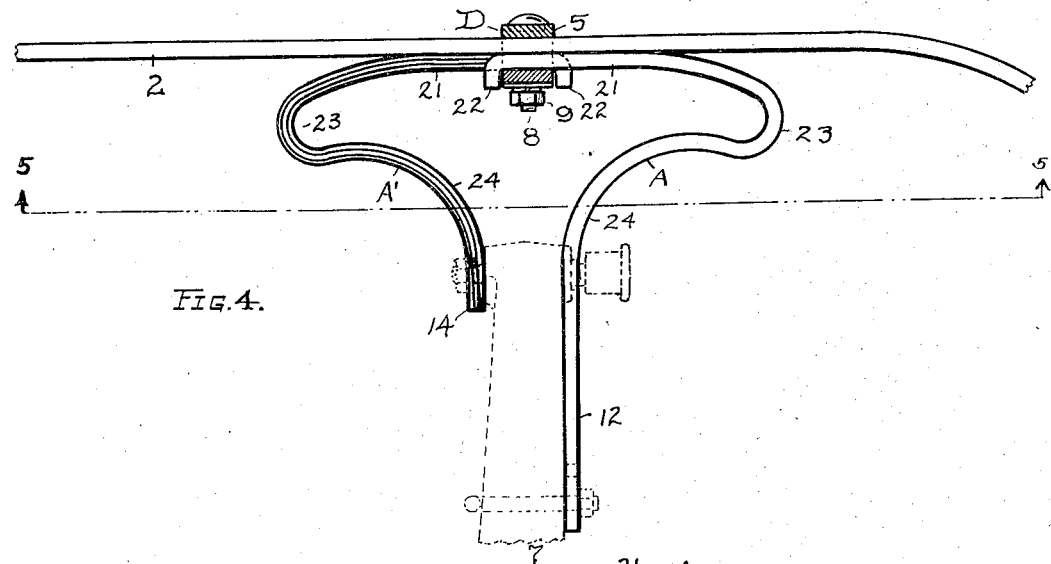
Figure 5:
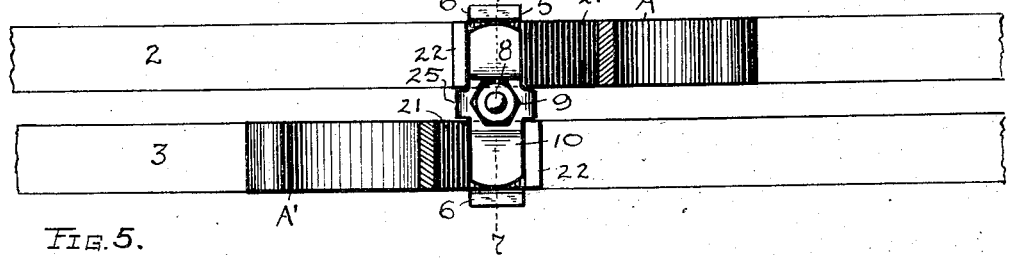
Figure 6:
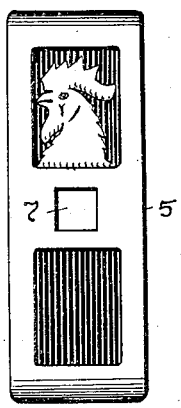
Figure 7:
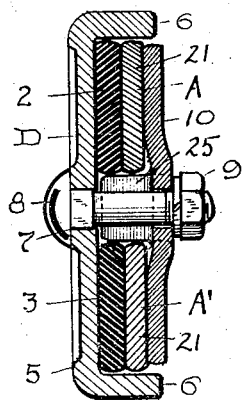
Figure 8:
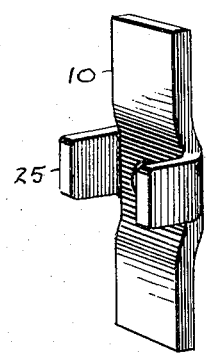

In the annexed drawings, Fig. 1 is a perspective view of the front end of an automobile equipped with my improved buffer, and Fig. 2 is a top view of the same buffer attached to the extending side bars of the chassis frame. Fig. 3 is an enlarged cross section of the buffer on line 3—3 of Fig. 2. Fig. 4 is an enlarged top view of one set of companion arms for the buffer bars, the clamping device being shown in section, and Fig. 5 is a rear view of the same assembly on line 5—5 of Fig. 4. Fig. 6 is an enlarged front view of one of the clamping plates used at the front of the buffer bars; Fig. 7 is a vertical section on line 7—7 of Fig. 5; and Fig. 8 is a perspective view of the clamping member which is employed to engage the spring arms.

The device comprises two flat buffer rails or bars 2 and 3, made preferably of spring metal, each bar being curved rearwardly for a short distance at its opposite ends. The extremities of these rails may also be neatly rounded and sharp abrupt edges avoided by winding or wrapping each end portion into a relatively small coil or convolution 4 substantially as delineated in Fig. 2. As shown the rails are of the same length and superposed parallelly edge to edge with their plane faces in vertical alignment, but spaced and held apart by duplicate sets of clamping devices D—D which also serve to clamp two pairs of spring attachment arms A and A' rigidly in different horizontal planes at the rear sides of said buffer rails. Each clamping assembly comprises a rectangular plate 5 adapted to be placed in a vertical spanning position at the front of the two rails and having rearwardly-extending flanges 6 at its upper and lower ends adapted to overlap and underlap the upper and lower edges of rails 2 and 3, respectively. A square opening 7 centrally of plate 5 receives the square neck of a clamping bolt 8, and the round stem of the bolt extends rearwardly through the space between the rails where its screw-threaded end may be engaged by a nut 9 and the nut brought to bear against a second clamping plate 10 placed in a vertical spanning position against the rear faces of the transverse ends 21 of the spring arms A and A', see Fig. 7. In this way arm A is rigidly secured against the rear face of upper rail 2 and arm A' is fastened tightly to the lower rail 3, and the two rails are rigidly clamped together. The two arms on each rail extend rearwardly in the same horizontal plane, but one pair lies in a higher plane than the other pair, so that each rail will be separately buttressed at uniformly-spaced distances inwardly from the opposite ends thereof, leaving the rail ends free to flex independently of the arms when objects are struck or engaged. The respective attachment arms A and A' are substantially alike in form and outline excepting that arm A has a relatively long straight rear branch 12 with a number of bolt holes 13 near its extremity, whereas arm A' has a shorter supporting branch 14 with a single bolt opening 15 therein. These short and long supporting branches are mounted upon opposite sides of the downwardly curved or slanting end portions 16 of the side bars of the chassis frame of the automobile, and the short branch 14 of arm A' is secured in place by a nut 17 screw-engaged with the shackle bolt 18 for the suspension spring 19, see Fig. 3. The long branch 12 of arm A is seated flat against the outer face of the side bar 16 and secured in place by a suitable clamping device, such as a hook bolt 20. When the two arms are firmly attached they extend forwardly on straight parallel lines but in higher and lower horizontal planes so that their laterally-extending front portions 21 may be placed one above the other in the same vertical plane and in overlapping edge to edge relation at their extremities to permit joint clamping thereof between plates 5 and 10, respectively. The extremity 22 of the lateral front portion of each arm may be bent abruptly to provide a short lip or flange adapted to fix the clamping relation of the plates and prevent displacement of the parts when assembled, and the lateral front portion 21 is relatively long and curved in part to promote flexibility and a spring action and which is further enhanced by forming a short spring bend 23 in the arm and connecting this bend with the rear end on sweeping curved lines 24 substantially as illustrated in Fig. 4. The arms A and A' are joined together by the clamping devices and act together in resisting a shock brought squarely against both rails, but the said arms are also free to act independently in some degree when a blow is imparted locally to a single rail.

Each attachment arm is made of a straight flat steel bar bent in its plane surfaces to provide a straight lateral spring portion 21, adapted to extend parallelly in frictional contact with a straight flat rail, and when a pair of companion arms are clamped jointly to a pair of rails the arms viewed as a whole are reversely related and their respective spring clamping ends extend toward each other. Viewed from the rear as shown in Fig. 5, the spring arms are spaced apart at their rear ends and offset laterally at their front ends in respect to the vertical medial line of the clamping plates and also spaced apart vertically by the lugs 25 on rear clamping plate 10.

What I claim, is:

A buffer for an automobile, comprising a pair of parallel buffer rails, a pair of attachment arms for each rail, each arm having a reverted spring portion at its front end extending parallel with the rail, the said arms being arranged in complementary pairs and the reverted portions of the complementary pairs being reversely related and overlapping each other in the same vertical plane at the rear of said rails, and a clamping device spanning said rails and embracing the complementary overlapping spring portions.

In testimony whereof I affix my signature hereto.

WILLIAM G. COX.

Witness:
DOROTHY M. MOSER.